United States Patent [19]

Diller et al.

[11] Patent Number: 5,257,128
[45] Date of Patent: Oct. 26, 1993

[54] FREEZING/PERFUSION MICROSCOPE STAGE

[75] Inventors: Kenneth R. Diller, Austin, Tex.; Douglas B. Walcerz, Medford, N.Y.

[73] Assignee: Board of Regents, The University of Texas System, Austin, Tex.

[21] Appl. No.: 389,614

[22] Filed: Aug. 4, 1989

Related U.S. Application Data

[63] Continuation-in-part of Ser. No. 210,088, Jun. 22, 1988, abandoned.

[51] Int. Cl.⁵ .................... G02B 21/28; G02B 21/30; G02B 21/34
[52] U.S. Cl. .................................. 359/395; 359/398
[58] Field of Search ............... 350/528, 529, 533, 536; 359/391, 395, 396, 398

[56] References Cited

U.S. PATENT DOCUMENTS

| | | | |
|---|---|---|---|
| 188,815 | 7/1852 | Nisbet et al. | 88/40 |
| 1,609,129 | 11/1926 | Roberts . | |
| 2,228,906 | 1/1941 | Bowen | 88/40 |
| 2,232,354 | 2/1941 | Weygand | 88/40 |
| 2,995,643 | 8/1961 | Gabler et al. | 219/19 |
| 3,218,925 | 11/1965 | Robertson | 88/40 |
| 3,230,773 | 1/1966 | Matthews | 73/362 |
| 3,297,491 | 1/1967 | Kolenko | 136/204 |
| 3,472,726 | 10/1969 | Scheidegger | 165/48 |
| 3,482,898 | 12/1969 | Van Den Bosch | 350/95 |
| 3,580,658 | 5/1971 | Swanson | 350/93 |
| 3,701,580 | 10/1972 | Sobajima | 350/90 |
| 3,969,013 | 7/1976 | Poty et al. | 350/528 |
| 4,629,862 | 12/1986 | Kitagawa et al. | 350/533 |
| 4,707,086 | 11/1987 | Dahan et al. | 350/536 |

FOREIGN PATENT DOCUMENTS

| | | |
|---|---|---|
| 418236 | 8/1925 | Fed. Rep. of Germany . |
| 457990 | 3/1928 | Fed. Rep. of Germany . |
| 1130615 | 5/1962 | Fed. Rep. of Germany . |
| 1283558 | 11/1968 | Fed. Rep. of Germany . |

OTHER PUBLICATIONS

Inque et al.; "Functional Organization of Mitotic Microtubules", Biophysical Journal; vol. 15, No. 7, Jul. (1975) pp. 725-744.

Reid; "A Programmed Controlled Temperature Microscope Stage"; Journal of Microscopy, vol. 114, pt. 2, Nov. 1978 pp. 241-248.

Forget; "Un Modele de Surplatine a Temperature Controlee Pour Les Observations Microscopiques Prolongees de Material Vivant" Microscopica Acta, vol. 85, No. 2, Nov. 1981 pp. 121-125.

A. L. Gallup, et al., Journal of Microscopy, A Microscope Cold Stage vol. 103, Pt. 2, Mar. 1975, pp. 285-287.

Berkovich, M. A. and Tkachenko, G. T., Industrial Lab, vol. 45, (1) 1979, Attachment to Optical Microscope for Operation at Low Temperatures, pp. 49-50.

Reid, D. S., Journal of Microscopy, vol. 114, pt. 2, Nov. 1978, pp. 241-248, A Programmed Controlled Temperature Microscope Stage.

Tynan, E. E. and von Gutfeld, R. J., IBM Technical Disclosure Bulletin, vol. 17 No. 8, Jan. 1975, Microscope Stage Sample Holder with Variable-Temperature Range.

(List continued on next page.)

Primary Examiner—Bruce Y. Arnold
Assistant Examiner—R. D. Shafer
Attorney, Agent, or Firm—Arnold, White & Durkee

[57] ABSTRACT

This invention relates to a microscope stage assembly for use in combination with magnification apparatus. The stage assembly includes a support assembly, temperature control assembly and fluid control assembly. The stage assembly provides for continuous visual observation of an object being magnified while at the same time controlling the thermal and fluid environment of the object. Physical and chemical changes to an object can be viewed continuously.

30 Claims, 4 Drawing Sheets

OTHER PUBLICATIONS

Diller, Kenneth R., Cryobiology 12, pp. 480-485 (1975), Intracellular Freezing: Effect of Extracellular Supercooling.

Jocelyn Forget, et al., Microscopica Acta vol. 85, No. 2, Nov. 1981 pp. 121-125, Un Modele de Surplatine a Temperature Controlee Pour Les Observations Microscopiques prolongees de Material Vivant.

Shinya Inque, et al., Biophysical Journal, vol. 15 No. 7, Jul. 1975 pp. 725-744, Functional Organization of Mitotic Microtubules Physical Chemistry of the in Vivo Equilibrium System.

Diller, K. R. and Cravalho, E. G., Cryobiology, 7, pp. 191-199 (1971) A Cryomicroscope for the Study of Freezing and Thawing Processes in Biological Cells.

Rubinsky B., et al., Cryobiology 22, 55-68 (1985) A Cryomicroscope Using Directional Solidification for the Controlled Freezing of Biological Material.

McGrath, J. J., et al., Cryobiology 12, 540-550 (1975) An Experimental Comparison of Intracellular Ice Formation and Freeze-Thaw Survival of Hela S-3 Cells.

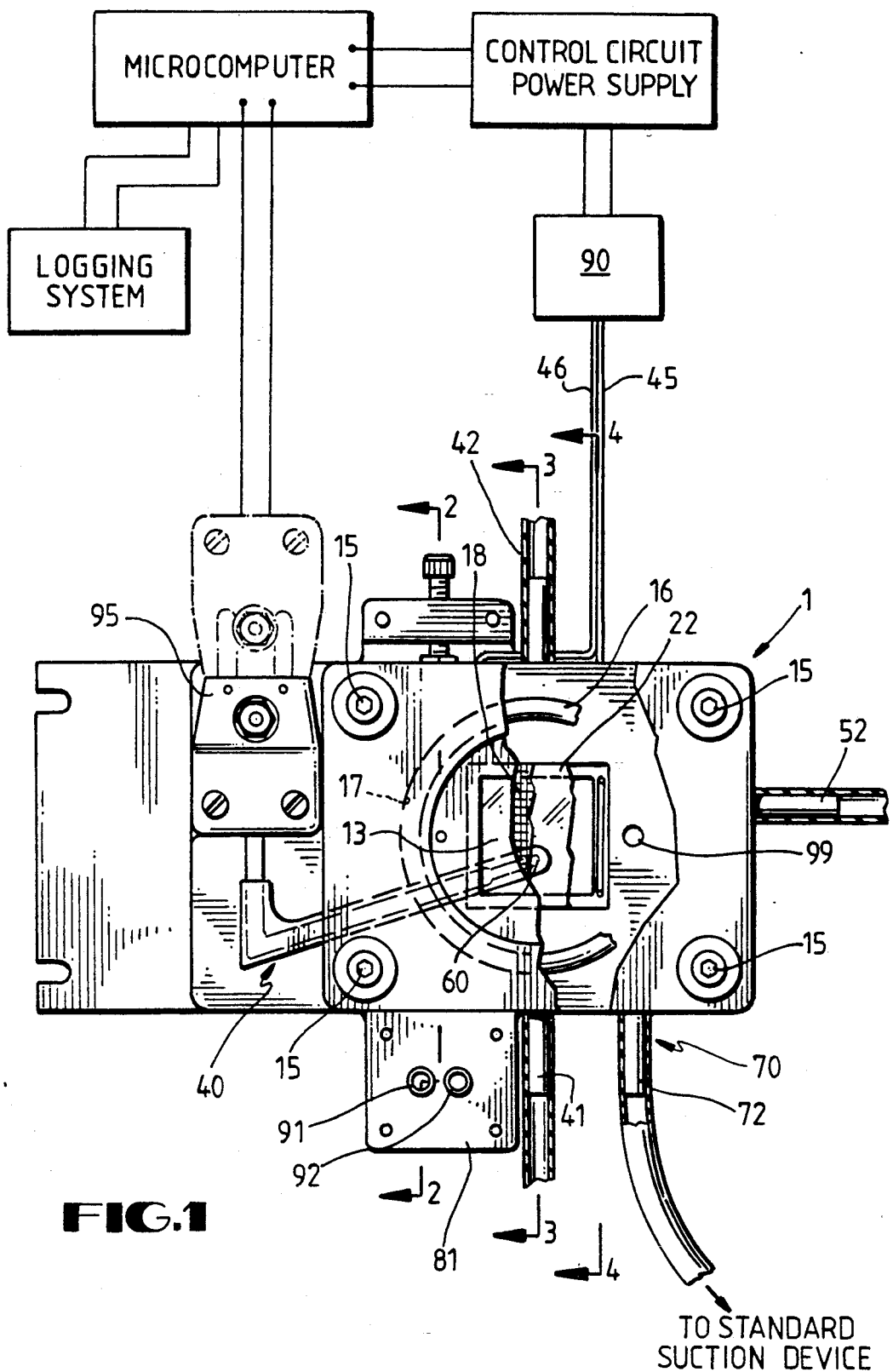

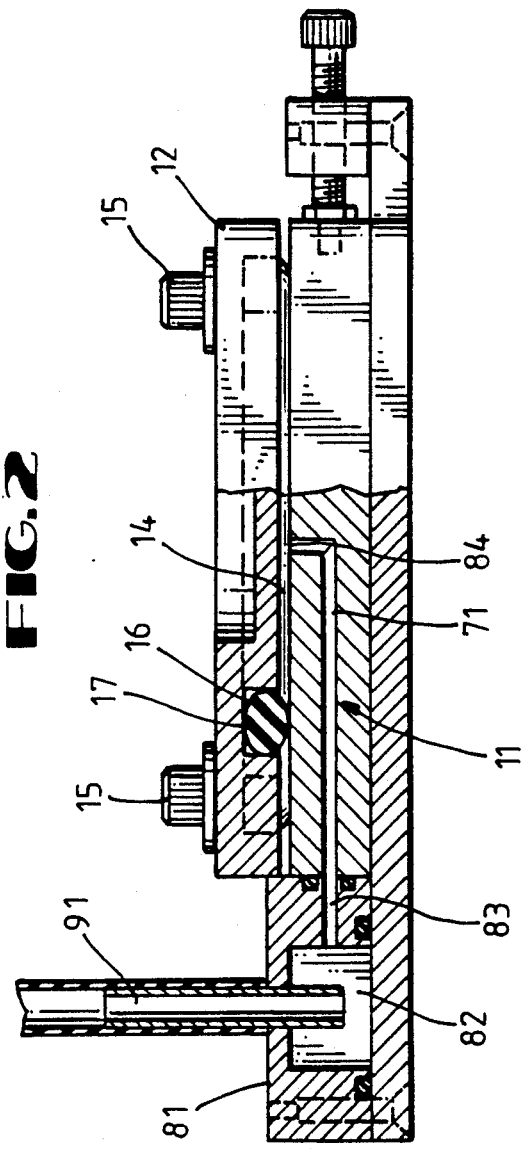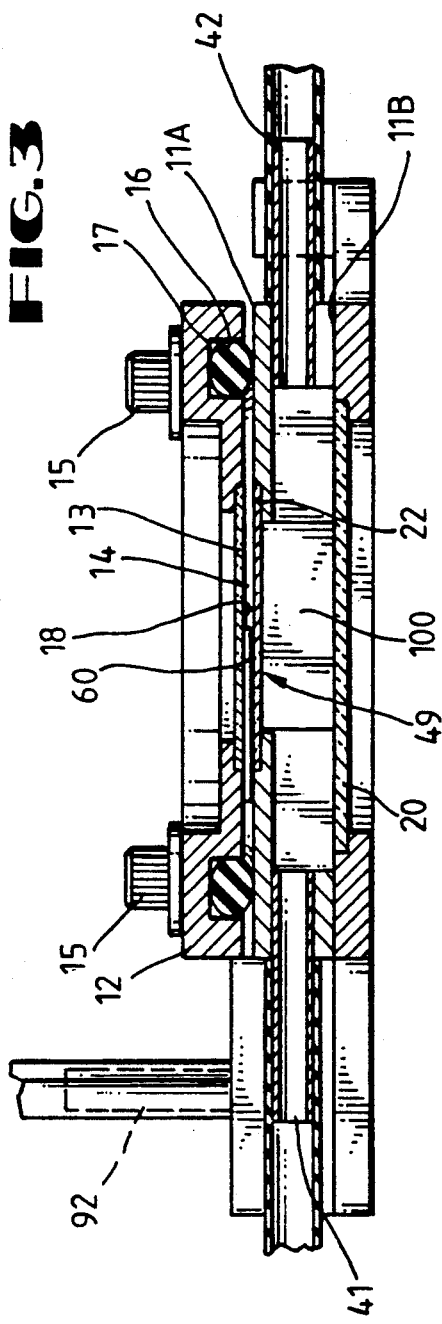

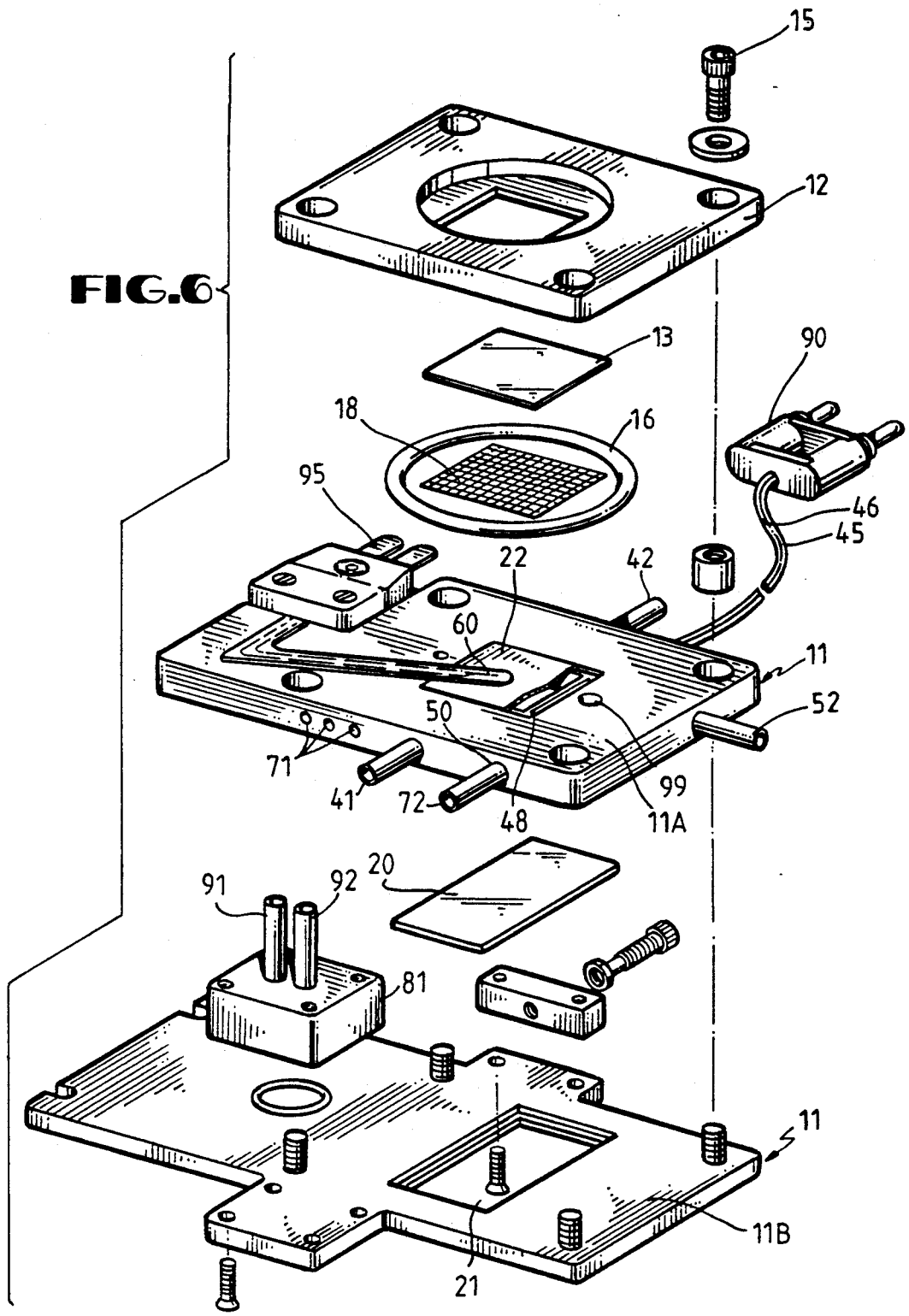

FREEZING/PERFUSION MICROSCOPE STAGE

This is a continuation-in-part of commonly assigned, copending patent application Ser. No. 210,088, filed Jun. 22, 1988 now abandoned.

BACKGROUND OF THE INVENTION

Field of the Invention

This invention relates to an improved freezing/perfusion microscope stage designed to control both the temperature and fluid environment of an object under magnification either simultaneously or in any desired sequence. The improved apparatus of this invention permits continuous viewing and allows movement and/or rotation of the object. The use of light microscopes to observe objects during physical transformation via temperature or fluid environmental change has long been an object of the scientific community but only recently has become a reality. The microscope stage of this invention combines elements for controlling both the temperature and fluid environments of the sample and allows movement of the object, all while under continuous observation.

For purposes of this application the term "object" is used to generically refer to the object being illuminated and/or magnified. This terminology is not intended to be limiting. Any object that is capable of being physically sized for placement in the microscope stage of this invention is suitable. The most preferred object of this invention is biological tissue. Other objects may be organic or inorganic, living or dead, growing, either in culture, in preservatives, in fluid or in any other physical state.

The terms "biological samples", "tissue samples", "tissue," "object" and "biological tissue" are used throughout this disclosure to refer to samples that can be treated in the microscope stage of this invention. The terms are used interchangeably and are not intended as a limitation on the functional capability of the apparatus disclosed herein. The terms should be understood to include small tissue samples appropriate for microscopic examination and larger tissue masses such as corneas which are appropriate for transplantation. The terms should be understood to include any material composed of one or more cells, either individual or in complex with any matrix or in association with any chemical; and to include any biological or organic material and any cellular sub-portion, product or byproduct thereof.

Thus, the contemplated utility of the apparatus of this invention is not limited to specific types or sizes of tissue, rather it should be understood to refer to any tissue made up of cells. The apparatus of this invention can be designed to accommodate any size, shape or type of cellular tissue or object. Therefore the terms "tissue," "tissue samples," "object," etc. are used interchangeably and are not limiting on the uses to which the method and apparatus of this invention can be placed.

The Description of the Related Art

Although many researchers have attempted to solve the problems inherent in the viewing of objects under magnification under variable conditions of both temperature and fluid environment, there has never been the successful combination of both fluid environment control means and temperature control means. Inevitably, in prior art devices, a tradeoff must be made between temperature control and fluid environment control. In most prior art devices the temperature of the particular sample can be controlled and fluids are merely used as a means for cooling or heating. See, for example, U.S. Pat. Nos. 3,218,925 and 3,472,726. The distinction between the use of fluids for cooling or heating and the actual control of the fluid environment surrounding the object being viewed is essential to an understanding of this invention.

Understanding the cryopreservation of cells could potentially impact several areas of medicine (i.e. organ transplant, etc). Thus, researchers have tried to follow, through observation, cryopreservation of cells in order to gain insight and information on how best to preserve and recover viable and functional living cells. For example, if one could properly freeze an organ with the capability of full recovery of its functions upon thawing, then organs could be stored frozen until suitable patients were identified. In order to microscopically study the cryopreservation of cells, the apparatus is preferably equipped with an accurate temperature control system, and most preferably a temperature control system that both heats and cools. Additionally, it is important to a full realization of the functional capabilities of this invention that the system method also be designed to permit altering the fluid environment in which the magnified object of interest resides. Including in the design, the ability to move or rotate the object of interest, along with the novel combination of control systems for both fluid environment and temperature would further optimize this invention.

A microscope stage which controls temperature as well as fluid environment, and at the same time permits movement or rotation of the object of interest, is not known. Thus, the field of cryopreservation would be advanced if such an instrument were available. The potential knowledge that could be gained from employing such an instrument has immediate and direct applications in the multibillion dollar business of livestock artificial insemination. In order to optimize the success ratios for artificial insemination, the livestock industry needs a reliable system which allows for the recovery, from a freezer bank, of viable and functional sperm, ova and embryos. Both the livestock industry and the field of tissue and whole organ transplant would benefit once this cryopreservation goal was achieved.

Heretofore it has been difficult, if not impossible, to observe tissue samples, microorganisms and the like for a substantial length of time under light microscopes because of the heat and resultant high temperature resulting from the intense light necessary for high magnification. Such temperatures quickly kill living specimens and evaporate their liquid culture. Under such conditions live specimens live only a very brief, unhealthy and abnormal time period, making conclusions derived from observation difficult and of doubtful accuracy. In order to reach any meaningful conclusions, researchers must spend long, frustrating periods of time observing many different short-lived specimens under the microscope.

Attempts have been made to solve the above mentioned heating problems by incorporating into the microscope itself, a cooling jacket filled with a liquid coolant in surrounding relation to the conventional microscope slide. However, such liquid cooling systems are unsuitable for observation requiring high magnification because light refraction through the liquid, as well as air bubbles in the liquid, become a problem. Also, in general, these previous systems do not achieve sub-zero temperatures for the study of cryopreservation. Liquid coolants cannot be interposed between the objective lens of the microscope and the slide specimen or between the specimen and the light source, at high levels of magnification, without causing unacceptable distortion of the image. Such cooling systems also greatly increase the complexity and expense of the microscope. See, for example, U.S. Pat. Nos. 2,228,906 and 3,482,898.

Attempts to heat and cool microscope stages are not new. However, the ability and advantages of the combination of thermal control with fluid environment control has never before been achieved. Examples of related art in which a microscope slide is cooled are U.S. Pat. No. 2,232,354 (condensation on cooling gas slides removed); U.S. Pat. No. 3,580,658 (gas convection cooling of microscope slides); Journal of Microscopy, Vol. 103, March, 1975, pages 285–287, A Microscope Cold Stage; Industrial Lab, Vol. 45, 1979, Attachment to Optical Microscope for Operation at Low Temperatures, Berkovich, M. A. and Tkachenko, G. T.; and German Patentschrift No. 418,236. Others have been involved with the mere heating of microscope slides. See, for example, U.S. Pat. No. 3,701,580; U.S. Patent Abstract 188,815; and German Auslegeschrift No. 1,283,558.

More sophisticated devices have involved both heating and cooling devices. These disclosures include U.S. Pat. No. 1,609,129 (nichrome wire used to heat brass blocks with fluid cooling); U.S. Pat. No. 2,995,643 (high temperature heating of metals); U.S. Pat. No. 3,230,773 (thermo electric heating and cooling); U.S. Pat. No. 3,297,491 (electrical resistance for heating and water channels for cooling a block which then conducts heat to a specimen); U.S. Pat. No. 3,969,013 (resistance heater and water or carbon dioxide containing passageways for cooling); U.S. Pat. No. 4,707,086 (electrical resistance for heating in water channels for cooling a block which then conducts heat to the specimen); German Patentschrift No. 457,990; and German Auslegeschrift 1,130,615. Articles of interest to the concept of heating and cooling a microscope slide are IBM Technical Disclosure Bulletin, Vol. 17, No. 8, January 1975, Microscope Stage Sample Holder with Variable Temperature Range; and Journal of Microscopy, Vol. 114, November, 1978, pages 24–248, A Programmed Controlled Temperature Microscope Stage.

Other references disclosing various embodiments of microscope stages are described hereinbelow. It should be noted that none of these references, or any other reference known to the applicants, discloses the unique combination of elements comprising the freezing/perfusion stage of this invention.

Reid, for example, described a temperature controlled microscope stage for optical microscopy which details the use of a foil type thermocouple (J. of Microscopy, 114(2): 241–248 (1978)). The thermocouple, in association with liquid nitrogen, gives an indication of the stage temperature and also acts as a programmer sensor. Reid's thermocouple is embedded in a mounting medium. The principle of embedding the thermocouple into a protective medium has been previously described (Diller, Intracellular freezing: effects of supercooling, Cryobiology 12:480–485 (1975): epoxy).

Affixing the thermocouple directly to the stage limits versatility and mobility and the mounting media itself may even cause further problems due to low melting points, etc. Replacing the mounting medium with, for example, a protective cover, not attached to the stage, would increase versatility and mobility. This protective cover could be in the form of plastic sheets. Also, Reid's temperature controlled microscope stage does not disclose altering solutions nor does it outline the use of a covering (i.e. laminated plastic) to protect the thermocouple from corroding effects of the fluid on the stage or from electrical currents that may be carried by electrolytes in the fluid.

Another example of a microscope stage, similar to the Reid microscope stage, also describes a controlled temperature stage for the observation of living organisms (Forget, Microscopia Acta 85(2):121–125 (1981)). This stage employs water-immersion objectives which eliminate the need for a coverslip. The Forget disclosure also does not detail control of movement or rotation of the object of interest for enhancing observation. This disclosure, therefore, offers limited improvement over the existing prior art microscope stages.

Kitagawa et al. describes yet another example of a microscope stage disclosure which attempts to accurately control temperature to a predetermined value, with uniform distribution, increased thermal efficiency and reduced response time (Kitagawa et al. U.S. Pat. No. 4,629,862). The Kitagawa disclosure also describes a means for observing the sample, as well as injecting a reagent into the observation chamber. This invention does describe a method for injecting reagents into the observation chamber but it does not describe how to rapidly change the solution thereby altering the fluid environment. Also, this patent does not describe how to move or rotate the object of interest for enhanced observation.

Another example of a microscope stage is detailed by Inoue et al. (Biophysical J., 15(7):725–744 (1975)). The stage of this disclosure includes a temperature controlled slide and miniature pressure chamber which permits controlled alteration of temperature and pressure. In this disclosure, the specimen is retained between two cover slips in a column of culture medium surrounded by a humidity-equilibrated gas phase. Inoue describes the circulation of fluid (hot and cold 50% ethanol) to the microscope stage for the purpose of achieving the desired temperature. However, this circulating fluid is separated from the specimen (which is retained between two cover slips) by a cover glass. Thus, the Inoue stage does not describe circulating fluid over the object of interest for the purpose of altering the fluid environment.

Of relevance to the basic development of the microscope stage of the invention described herein is an article by Kenneth R. Diller and E. C. Cravalho entitled "A Cryomicroscope for Study of Freezing and Thawing Processes in Biological Cells" Cryobiology, 7, 191 (1971). Although this article discloses the use of heat control with microscope slides there is no disclosure of fluid environment control means. The Diller et al. microscope slide represents a significant improvement over prior devices in that a resistive coating is applied to the glass coverslip to facilitate heating. Thus, the Diller et al. microscope slide does not include means to control the fluid environment or a method for moving or rotating the specimen.

In reviewing certain of the publications cited above, it is important to note that heating of the prior art devices is typically by use of electrical resistance heating elements to heat a block (usually copper) which conducts heat to a specimen. The microscope stage of the invention described herein uses electrical heating of a resistance coating on a glass cover slip (hereinafter "resistive coverslip"). The resistive cover slip has virtually no thermal capacitance compared to copper blocks, and thus provides very fast temperature control.

Similarly, some of the prior art stages use fluid flowing through channels to cool a block which in turn conducts heat away from the specimen. The microscope stage of this invention uses cold gas to cool the underside of a glass cover slip which comprises the viewing area. Again, this design permits a fast temperature control.

Finally, and most importantly, none of the prior art patents or articles describe devices for controlling the fluid environment of an object, or how to combine such fluid environment control with thermal control over a wide range of temperatures and rates of temperature change. This is an area of extreme advantage to the invention of this disclosure.

A microscope stage designed to eliminate some of the existing prior art limitations would ideally be characterized by the following criteria.

The ideal microscope stage would have the ability to observe individual cells and tissues over a wide range of sizes with the upper limit being approximately 250 micrometers.

This microscope stage would also permit serial perfusion of the specimen and rapid exchange of the bathing medium with a time constant on the order of one second. This perfusion exchange should be accomplished while continuously maintaining the specimen in focus in the microscopic field of view.

This ideal design should allow for rapid and controlled temperature variations of both the stage and specimen perfusate fluid environment over a range of values above and below 0° C. The rapid changes in specimen temperature should occur at rates up to ±100° C./minute in the temperature range between 100° C. and −100° C.

The microscope stage design should also permit continuous observation of the specimen throughout various manipulations (serial perfusion, freeze-thaw, reperfusion, etc.) as well as controlling nucleation of extracellular ice within the specimen at specific temperatures.

This microscope stage should also have the ability to measure osmotic response of individual cells or of multicellular tissues as well as the ability to move and/or rotate the specimen while under continuous and focused observation.

The invention disclosed herein will eliminate several major drawbacks which researchers, in the field of cryopreservation and organ transplant, have been faced with as well as satisfying the above described criteria. Disclosed herein is a microscope stage which permits the movement or rotation of the magnified object of interest, while simultaneously controlling and manipulating the temperature and fluid environment. This apparatus offers the novel combination of simultaneous and continuous control of the thermal and fluid environment of the object of interest, over a wide spectrum of states, as well as the ability to move or rotate the object for enhanced observation. To date, no apparatus of similar capacity has been described.

SUMMARY OF THE INVENTION

This invention provides an improved microscope stage for the continuous viewing of a magnified object while the temperature and fluid environment are being modified. In its broadest form the stage assembly includes a support assembly, temperature control means and fluid control means.

The support assembly includes a base support member and a cover member which are transparent to provide for viewing under magnification. For purposes of this application, the term transparent shall be understood to mean the condition of light transmittance appropriate for use in a light microscope. The support assembly also includes a chamber in which the object is placed and sealing means, preferably an O-ring, for sealing the base support member to the cover member. Optionally, the support assembly also includes an inert stationary nylon mesh member which supports the object. The stationary nylon mesh permits circulation of fluid around the object while constraining the object to remain in the microscope field of view.

In the preferred embodiment the temperature control means is built into, and therefore functionally associated with, the physical structure of the support assembly. This temperature control means selectively regulates the temperature of the chamber between −100° C. to +100° C. Temperature control is achieved by employing a microcomputer. The brand or design of microcomputer employed is not considered part of this invention, however, an IBM PC AT computer or its equivalent have demonstrated utility in this invention. The temperature control means includes a resistance heating means or element for the purpose of electrically heating the microscope stage. The resistance heating element includes electrical connections of heating means to the support assembly preferably accomplished by colloidal silver connectors.

The temperature control means further includes cooling means preferably convection cooling means. The stage assembly is preferably cooled by forced convection, employing gaseous nitrogen or helium. The temperature control means further includes a thermocouple connected to control means for controlling the temperature of the support assembly and object or specimen. In the preferred embodiment the thermocouple is comprised of a thin foil type thermocouple laminated between two sheets of plastic. Each sheet of laminated plastic is preferably a thickness of from about 0.0010 to about 0.0020 inches thick. This laminated plastic covering is functionally effective to protect the thermocouple from the corroding effects of the fluid on the stage as well as electrical currents that may be carried by electrolytes.

The fluid control means includes inlet and outlet channels from the support assembly chamber for fluid communicating directly with the chamber. The fluid control means further includes a reservoir for fluid to be supplied to the chamber. The fluid control means further includes suction means for causing bidirectional movement of fluid between the inlet channel and outlet channel of the chamber. Preferably, the inlet channel of the fluid control means is located physically lower than the inlet and outlet channels to the reservoir in order to functionally trap air bubbles in the reservoir. The fluid control assembly further includes a temperature control means to control the temperature of the fluids in the reservoir.

The outlet tube of the fluid control means, from the chamber, is preferably a copper tube disposed in a larger channel so that the copper tube can be rapidly cooled by a cooling fluid, i.e., gaseous nitrogen or helium. The coolant fluid can be circulated over the exterior surface of the copper tube. In the most preferred embodiment of the invention a cooling fluid in liquid form cools the gaseous phase coolant before the gas enters the cooling chamber. Preferably no fluid enters the cooling chamber. Preferably an air bubble trap is provided in the reservoir to preclude air bubbles from escaping into the sample chamber. In the most preferred embodiment of the invention the reservoir also includes inlet and outlet tubes and there is a temperature control system to regulate the temperature of the fluid in the reservoir. A microcomputer can be programmed to control the temperature of the fluid in the reservoir.

The reservoir has several features that should be explicitly described, as they are essential to the function of the stage. The reservoir stores perfusate at the inlet position of the stage, facilitating rapid exchange of fluid across the viewing area. The stage inlet tube has a small volume to enhance the rapid exchange. The reservoir itself has an inlet and an outlet (different from the inlet and outlet of the stage) to permit the contents of the reservoir to be changed without affecting the fluid on the stage. The reservoir is configured such that the bulk of its volume is above the passageway connecting the reservoir to the stage inlet, thus any air bubbles that may be present will not enter the stage.

Optionally a microcomputer can be added to the system to automatically control both the temperature and fluid conditions within preset ranges. A logging system can be added to automatically or variably record temperature and fluid conditions of the sample. Video recording means may be used to automatically video record the object being magnified. The microcomputer and logging equipment are conventional and commercially available.

One of the more important functional features of the microscope stage is that it performs all of its functions while on the microscope itself. The tissue specimen or object can be observed continuously. One of the many uses for this improved stage is to observe biological tissues as they are subjected to cryopreservation procedures which requires wide ranging temperature control and washing of the specimen. Prior microscope stages allowed specimens to be washed at a controlled temperature (diffusion stages), or provided a wide range of temperature control for a given specimen in a given fluid environment (cryostages). None of the prior art devices could perform entire cryopreservation procedures, requiring that either the specimen be transferred from one stage to another, or that only a partial procedure be done. This greatly hindered the accrual of knowledge regarding cryopreservation of biological materials. The new improved diffusion freezing stage of this invention is a significant improvement over the prior technology as it provides continuous information on a specimen throughout a cryopreservation procedure.

The immediate use for the stage of this invention is the examination of living biological materials undergoing cryopreservation. Specifically it is used to observe cellular swelling, cellular dehydration, ice crystal formation, intracellular freezing, freezing front motion, melting front motion and cell morphology. Information from observations is used to compute fluid flows into and out of the cells, cell membrane permeability to various fluids as a function of temperature, and most importantly cell survival rates for various cryopreservation procedures.

Additionally, the bidirectional nature of fluid flow in the stage of this invention permits the object to be moved back and forth, pushed and rotated allowing the three dimensional features of the specimen to be fully examined. This capability is important since it provides a quantitative test for the assumption of spherical specimens, an assumption that is the basis from many experiments. This stage can also be used to measure the three dimensional shape of nonspherical items.

The improved stage of this invention provides a highly controlled environment, and is ideal for culturing living systems. It can be used wherever continuous microscopic observation of specimens is required. The stage is also useful in the testing of non living systems. The stage can be used to examine microscopic changes in materials in harsh fluid environments under extremes of temperature, such as coatings for ship hulls or other marine equipment.

BRIEF DESCRIPTION OF THE DRAWINGS

FIG. 1 is a top view in partial section of the microscope stage of this invention.

FIG. 2 is a partial cross-sectional view of the microscope stage of this invention taken at line 2—2 of FIG. 1.

FIG. 3 is a partial cross-sectional view of the microscope stage of this invention taken at line 3—3 of FIG. 1.

FIG. 6 is an exploded view showing the fluid control assembly, temperature control assembly and support assembly.

DETAILED DESCRIPTION OF THE INVENTION

Figure 4:
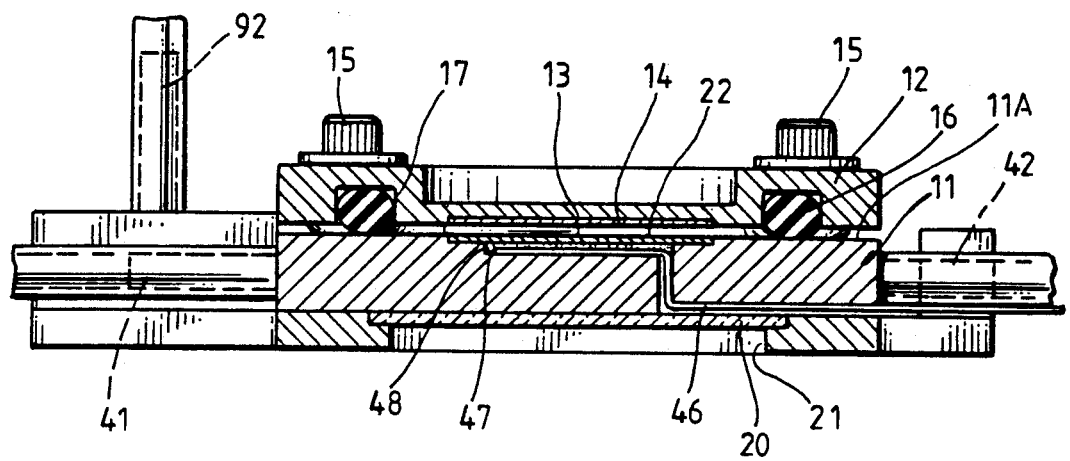
FIG. 4 is a cross-sectional view of the microscope stage of this invention taken at line 4—4 of FIG. 1.

Referring now to FIGS. 1-4 it is shown that the stage assembly 1 of this invention includes as its basic components a support assembly 10, a temperature control assembly 40 and fluid control assembly 70. Also contemplated but not shown in the drawings are microscope, object and a microcomputer.

Figure 5:
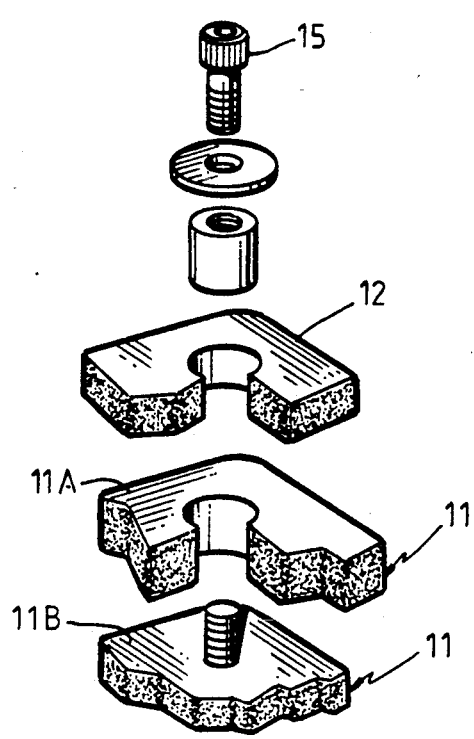
FIG. 5 is an exploded view of the fastening means for securing the cover member to the base support member.

The support assembly 10 as shown more particularly in FIG. 6 includes a base support member 11 and a cover member 12. Cover member 12 may include window 13 to facilitate light transmittance. A sample chamber 14 is defined on bottom by the top surfaces of resistive coverslip 22 and member 11A; on the top by the bottom surfaces of window 13 and cover member 12; and on the sides by the inner surface of O-ring 16. (See FIG. 3). In one embodiment of the invention the base support member 11 and cover member 12 are removably attached to one another by threaded screws 15 as shown more particularly by FIG. 5.

It is preferred that the junction of base support member 11 and cover member 12 be sealed. Such sealing is accomplished by O-ring 16 which is compressed between base support member 11A and cover member 12 when threaded screws 15 are tightened. The amount of compression necessary is simply that which is functionally effective to seal the sample chamber under the temperature and pressure conditions contemplated.

In order to facilitate viewing by a microscope it is necessary that at least a portion of the sample chamber 14, as defined by base support member 11 be transparent. Likewise it is essential that at least a portion of cover member 12 be transparent, e.g., window 13. The areas of transparency and particular light transmittance characteristics of the materials used to make base support member 11 and cover member 12 are well within the knowledge of a person of ordinary skill in the art. In one preferred embodiment the entire cover member 12 is transparent and the entire sample chamber area 14 of base support member 11 is transparent.

Also a part of the support assembly is an inert stationary nylon mesh member 18 (see FIGS. 3 and 4). Stationary nylon mesh member 18 is intended to provide a support for the object being viewed and to likewise permit circulation of fluids around the object. It is preferred that the stationary nylon mesh 18 be inert to the object. Stationary nylon mesh 18 may be sized and configured to facilitate whatever sample or object is being viewed. In the most preferred embodiment stationary nylon mesh member 18 is in physical contact with the cover member 12, the bottom surface of window 13, as well as base support member 11A, and the upper surface of resistive coverslip 22. The object under observation is supported inside of mesh member 18. More specifically, a stationary nylon mesh 18 is placed in the center of the cover member near the thermocouple. The mesh allows fluid flow past the specimen, but it does not allow it to be swept away by the flow and pulled into the outlet tube. Such an arrangement facilitates thermal conductivity to the object and fluid flow around the object. Other arrangements of the mesh, sample chamber and object are also within the scope of this invention. The described preferred embodiment has demonstrated utility with biological samples although other arrangements with other types of objects are equally feasible.

The stage assembly of this invention is intended for use with any magnification apparatus. In the preferred embodiments presently contemplated the use would be with a light microscope. It is, however, within the scope of this disclosure to modify the stage assembly to provide access to use with electron microscopes or other high resolution, high magnification microscopes. For purposes of this application, the particular microscopic application is not an important feature. The basic concepts of this invention may be used to create a stage assembly which is adaptable for use with all types of magnification apparatus. However, for purposes of this disclosure the preferred embodiment of magnification apparatus will be assumed to be a light microscope.

Likewise, the particular object being viewed and magnified is not intended to be a limiting feature of this invention. While it is contemplated that biological tissue, biological samples and the like are the preferred objects for viewing it is entirely possible that other inanimate or inorganic materials may likewise be usefully viewed and physically altered by the stage assembly of this invention. It should also be understood that the particular size of the object being viewed is not of inventive significance. The stage assembly and support assembly of this invention may be configured and sized appropriately to sustain any size object.

In the most preferred embodiment of this invention, wherein a light microscope is used as the magnification apparatus, it is necessary that illuminating means be associated with a light microscope. Such illuminating means may be direct or indirect. In each instance it is essential that either one or both of the base support member 11 or cover member 12 be transparent to either permit light transmittance and/or light reflectance. Therefore the particular arrangement or configuration of the base support member 11 and cover member 12 and the transparent portions thereof are a matter of coordination with the magnification apparatus being used and are well within the skill of one in the art.

The temperature control system of this invention is illustrated by FIGS. 1 and 6. Specifically, control of the temperature and fluid environments existing in the sample chamber 14 are essential to the practice of this invention. The temperature control means includes both forced convection cooling means and resistance heating means. The cooling means include a cold gas inlet tube 41 and a cold gas outlet tube 42. The tubes 41 and 42 are channeled through the base support member 11 and are in close proximity to sample chamber 14 so that cold energy can be transferred to the sample chamber via forced convection. Typically, nitrogen or helium gases are used as convection cooling gases.

The cooling means of the temperature control system can, for example, operate under the following conditions: cold nitrogen gas enters through an inlet tube 41, flows through the cooling chamber, which is tapered for smooth flow, and out of the outlet tube 42. The smooth gas flow past the stage surface makes the stage temperature as uniform as possible. The cooling chamber 100 is bounded on top by the coated bottom side of resistive coverslip 22 (in member 11A); on the bottom by the top surfaces of member 11B and window 20 (which is located in recess 21 in member 11B) and on the sides by the vertical walls of member 11A (see FIG. 3). The resistive coverslip 22 is transparent, and has an electrically conductive coating may be applied to the bottom surface of resistive coverslip 22. By virtue of its thinness, it conducts heat from the sample to the cooling chamber very quickly.

The heating system is a resistance heating system and likewise is demonstrated by FIGS. 2–4 and 6. Electrical wires 45 and 46 are connected to a source of power (not shown). At the opposite end the wires are connected via colloidal silver 47 deposited in wells 48 in association with the base support member 11. In the most preferred embodiment of this invention the cover member 12 is coated with a transparent resistive coating 49 (see FIGS. 3 and 4) which is placed in contact with colloidal silver 47 in wells 48 when threaded screws 15 are tightened. In this fashion, power and thus resistive heating energy are supplied to electrical wires 45 and 46 and thus to colloidal silver 47 in wells 48. This heat energy is transferred through colloidal silver 47 onto transparent resistive coating 49 which covers the bottom side of resistive coverslip 22 thus supplies heat energy to the content of sample chamber 14.

More specifically, the stage surface is heated electrically. The resistance heating system consists of two wires (45 and 46) connected to the edges of the resistive coverslip 22, which is coated by metal evaporation techniques so that it has about a 100 ohm resistance from edge to edge. The vanishingly thin metal coating 49 does not significantly reduce the transparency of the resistive coverslip 22. When electrical current is passed across the resistive coverslip 22, $I^2R$ heating occurs. $I^2R$ heating occurs when electrical energy is converted to thermal energy (I is the current and R is the resistance). The purpose of the heater is twofold: to heat the resistive coverslip 22 above room temperature and to provide a convenient way to control the temperature of the cover member during cooling. The amount of heating is easily controlled electronically using conventional computers, i.e. an IBM PC AT computer.

The electrical connection of the coated surface of resistive coverslip 22 to electrical wire is accomplished using colloidal silver 47. Small wells 48 are hollowed out of member 11A under the edges of the resistive coverslip 22, and wires 45 and 46 are fed through channels in the stage to the wells 48. Colloidal silver 47 is poured into the wells 48 and then allowed to set, which establishes a good electrical connection between the resistive coverslip 22 and the wires. The wires are connected via a control circuit to a power supply.

The temperature of the stage is measured with a thermocouple which, preferably copper based, is connected to a meter so that the temperature can be observed at all times. The thermocouple is also connected to the computer system, which compares the actual stage temperature with a programmed temperature and adjusts the amount of resistance heating accordingly. Using this system, the stage can be controlled to within 1° C. of the desired temperature. The thermocouple, resistance heating circuit, and convective cooling chamber constitute the elements of the preferred embodiment of the temperature control system for the stage.

Referring now to FIGS. 1 and 6 there is shown an ice nucleation system functionally associated with stage assembly 1 and sample chamber 14. The ice nucleation system includes a copper fluid outlet tube 72 which communicates with sample chamber 14. The fluid outlet tube is disposed within gas outlet channel 50 defined by the surface of member 11A and the top surface of member 11B adjacent thereto such that a cold gas can be introduced into said channel via gas inlet 52 thereby exposing fluid outlet tube 72 to sufficiently cold temperatures to cause the liquid tube 72 to begin to freeze. so that a cold gas can be transferred through gas inlet channel 52 which will be exposed to copper tube 50 which is disposed in said channel 52. By such action an ice nucleation system can be implemented.

The ice nucleation system is used to begin the formation of ice around the specimen. The bent copper fluid outlet tube 72 is cemented in place within gas outlet channel 50. In contrast, the fluid inlet tube 71 is simply a hole drilled in the acrylic stage. The fluid outlet tube 72 is filled with fluid at all times because the perfusion system does not admit air. Cold nitrogen gas introduced through gas inlet 52, is directed over the surface of the copper fluid outlet tube 72, thus cooling the tube very quickly and causing the fluid contained therein (in copper fluid outlet tube 72) to form ice. The ice then propagates up the tube 72 toward the resistive coverslip 22, stopping at a point where the cooling from the copper tube 72 is balanced by the controlled temperature of the resistive coverslip 22. In a typical freezing procedure, the temperature of the resistive coverslip 22 is slowly decreasing. As this happens, the ice grows onto the resistive coverslip 22 and eventually the entire resistive coverslip 22 will be covered with ice.

In the most preferred embodiment of this invention the stage assembly 1 is connected to a microcomputer so that the fluid and thermal environment of the object contained within the sample chamber 14 can be controlled and recorded. To facilitate such computer control a thermocouple 60 is attached to one or more surfaces of the base support member 11 or cover member 12. In the preferred embodiment the thermocouple 60 is attached to a surface of the base support member 11. The preferred thermocouple 60 used to measure the temperature of the sample chamber is a thin foil type thermocouple and is laminated between two sheets of plastic. Each sheet of plastic is from about 0.0010 to about 0.0020 inches thick. The lamination protects the thermocouple from the corroding effects of the fluid in the sample chamber and also protects it from electrical currents that may be carried by electrolytes in the fluid. Such currents would render the thermocouple useless.

The fluid control system 70 of this invention is demonstrated by FIGS. 2 and 6. Alternately the fluid control system is referred to as a perfusion system or as fluid control means. It should be understood for purposes of this application that these terms are used interchangeably. The perfusion system includes a fluid inlet tube 71 and a fluid outlet tube 72. Both inlet 71 and outlet 72 communicate directly to sample chamber 14. Inlet tube 71 is likewise connected to a fluid reservoir 82. The fluid reservoir 82 contains the fluid which is supplied to sample chamber 14. The particular fluid used is a matter of convenience and may be as simple as distilled water to more complex chemicals which are designed to add a specific function for chemical/physical modification to the object. The only requirement for the fluid is that it must be compatible with the optical viewing characteristics of the magnification apparatus being used. Various stains, cryoprotectants, preservatives and similar solutions have demonstrated utility in combination with the stage of this invention.

Fluid is forced into the sample chamber through inlet tube 71 by means of a suction device attached to outlet tube 72. The suction device is conventional in the art and well within the design and understanding of a person of ordinary skill in the art. In the most preferred embodiment the aperture leading from inlet tube 71 to sample chamber 14 has a relatively small diameter, in the order of 0.047 inches. With this arrangement a very small flow of fluid (in the order of 0.002 cubic inches) is required to move fluid from the reservoir to the sample chamber 14.

With the suction device movement of fluid is actually bidirectional in the sample chamber 14. Such bidirectional movement can be used to physically move the object.

The reservoir 82 is likewise provided with an inlet 91 and outlet 92 so that fluid levels can be controlled in the reservoir. Optionally a temperature control element (not shown) can be used in combination with the reservoir 82 to provide fluids at appropriate temperatures to the sample chamber 14.

A bubble trap is provided by the particular configuration of inlets and outlets in the fluid control system 70 of this invention. Specifically, the aperture 83 connecting the reservoir 82 to the sample chamber 14 is physically lower than the bulk of the reservoir. With this arrangement any air bubbles that may be present in the reservoir will be harmlessly trapped in the reservoir and will not be pulled onto the stage.

In the most preferred embodiment of this invention the stage assembly 1 and the various temperature control means and fluid control means are connected through the microcomputer to logging means. Logging means may take the form of a video camera or other type of analytical recording instrumentation. The particular instrumentation used is not considered an inventive feature hereof. However, the unique arrangement of the elements and subassemblies of this invention provide the basis for the continuous viewing of an object and preferably recording of useful information regarding such an object.

In actual practice the stationary nylon mesh member 18 is placed into sample chamber 14 such that it rests on the top surface of resistive coverslip 22 and portions of member 11A adjacent to resistive coverslip 22. The object to be viewed is then placed in mesh member 18 so that it is supported in a suspended state in sample chamber 14. Cover member 12 with O-ring 16 in place in groove 17 is then lowered onto base support member 11A such that window 13 is directly above the object being viewed and permits viewing through resistive coverslip 22 window 20 in base support member 11B. Therefore viewing of the object is through window 13, resistive coverslip 22, and window 20. Threaded screws 15 are then placed through cover member 12 and tightened to compress O-ring 16 such that a seal is formed for the entire circumference of O-ring 16 between base support member 11 and cover member 12.

After cover member 12 is in place and properly aligned to permit viewing of the object, the temperature control means 40 can be activated to permit appropriate heating or cooling of the object in sample chamber 14. Likewise the fluid control system of perfusion system may be activated to flood the sample chamber, move the object being viewed or alter the object being viewed by perfusion.

In the most preferred embodiment of this invention as demonstrated specifically by FIG. 6 the base support member 11 includes two members constructed of stainless steel or some other suitable material. The members are identified as 11A and 11B in FIG. 6. Window member 20 is disposed in housing 21 in member 11B. When members 11A and 11B are joined by threaded members 15 window 20 is disposed underneath sample chamber 14 which has been cut into member 11A. Sample chamber 14 in member 11A has glass surface 22 on which the mesh member 18 can rest during actual viewing.

Wells 48 are cut into member 11A to facilitate receipt of colloidal silver connecting material. At the bottom of wells 48 the electrical connectors 46 and 45 are respectively attached so that when colloidal silver 47 is in wells 48 an electrical contact is established.

Cold gas inlet tube 41 and outlet tube 42 are inserted into appropriate channels in base support member 11A. Likewise, ice nucleation channels 52 and 50 are cut into base member 11A. Reservoir fluid inlet and outlet tubes 91 and 92 are set in block support 81 mounted on base support member element 11B.

During use electrical connector 90 is plugged into an appropriate power source to provide electrical power to wires 45 and 46 which are then transformed into heat energy by resistance coating 49. Connector 95 is plugged into an appropriate microcomputer or other control circuitry to monitor and/or log the temperatures sensed by thermocouple 60. O-ring 16, window 13 and cover member 12 are described hereinabove.

Fluid control inlet 71 communicates with sample chamber 14 through a channel formed in base member 11a. Such arrangement of the fluid control means 40 is shown more specifically in FIG. 2. In FIG. 2 inlet 71 is shown going into support block 81. Support block 81 contains a fluid reservoir 82 from which connecting channel 83 communicates directly with inlet channel 71 in base support member 11A. Channel 71 communicates directly with sample chamber 14 through aperture 84.

A similar arrangement for returning fluid through tube 72 is provided.

Although the preferred embodiment of this invention has been described hereinabove in some detail, it should be appreciated that a variety of embodiments will be readily available to a person designing such a stage apparatus for a specific end use. The description of the apparatus of this invention is not intended to be limiting on this invention, but is merely illustrative of the preferred embodiment of this invention. Other apparatus and components which incorporate modifications or changes to that which has been described herein are equally included within this application.

What is claimed is:

1. A stage assembly for use in combination with a magnification apparatus to permit viewing of an object being retained in said assembly, comprising:
   (a) a sample chamber for retaining said object and receiving fluid therein;
   (b) means for illuminating said object;
   (c) temperature control means for heating and cooling said object; and
   (d) fluid control means for controlling and altering the fluid in said chamber retaining said object, comprising:
      (i) fluid inlet and outlet channels for fluid communicating directly with said chamber, said outlet channel comprising a copper tube positioned within a larger channel such that a coolant fluid can be circulated over the exterior surface of said copper tube;
      (ii) a reservoir connected to said fluid inlet channel, said reservoir having an inlet and an outlet channel;
      (iii) a suction means for causing movement of fluid between said fluid inlet channel and said fluid outlet channel; and
      (iv) said fluid inlet channel for communicating directly with said sample chamber being located physically lower than said inlet and outlet channels to said reservoir, in an arrangement to trap bubbles in said reservoir.

2. The stage assembly of claim 1 wherein said sample chamber includes a base support member and a cover member, each of said members being substantially transparent.

3. The stage assembly of claim 1 wherein said magnification apparatus is a light microscope.

4. The stage assembly of claim 1 wherein said temperature control means include a microcomputer.

5. The stage assembly of claim 1 further including logging means for recording variable conditions of said object or said sample chamber.

6. The stage assembly of claim 1 wherein said temperature control means includes a thermocouple attached to one or more surfaces of said sample chamber, said thermocouple measures the temperature at the point of attachment.

7. The stage assembly of claim 6 wherein said thermocouple is a thin foil type thermocouple laminated between two sheets of plastic.

8. The stage assembly of claim 7 wherein each of said sheets of plastic is from about 0.0010 inch to about 0.0020 inches thick each.

9. The stage assembly of claim 1 wherein said object is a biological sample.

10. The stage assembly of claim 1, wherein said reservoir further comprises temperature control means to control the temperature of fluids in said reservoir.

11. The stage assembly of claim 1 wherein said temperature control means for cooling is by forced convection directly to said sample chamber on which said object to be magnified is supported.

12. The stage assembly of claim 1 wherein said sample chamber comprises:
   (a) a base support member having a transparent portion;
   (b) a cover member having a transparent portion removably coupled to said base support member;
   (c) means for sealing said base support member to said cover; and
   (d) a chamber defined by the surfaces of said base support member, said cover member, and said sealing means.

13. The stage assembly of claim 12 wherein said sample chamber further comprises a stationary nylon mesh member to hold said object.

14. The stage assembly of claim 12 wherein said means for sealing said base support member to said cover comprises an O-ring.

15. The stage assembly of claim 1 wherein said temperature control means for heating is by resistance heating.

16. The stage assembly of claim 15 wherein said resistance heating includes electrical connection of heating means to said stage assembly by colloidal silver connectors.

17. The stage assembly of claim 1 wherein said suction means cause bidirectional movement of fluid between said inlet channel for fluid communicating directly with said sample chamber and said outlet channel for fluid communicating directly with said sample chamber.

18. The stage assembly of claim 1 further including a means for nucleating ice crystals in said chamber.

19. A stage assembly for use in combination with a light microscope, said assembly permitting observation of an object under magnification, comprising:
   (a) an assembly for retaining the object being magnified, comprising:
      (i) a base support member having a transparent portion through which the object is viewable;
      (ii) a cover member having a transparent portion through which the object is viewable, said cover member being removably coupled to said base support member;
      (iii) means for sealing said base support member to said cover member; and
      (iv) a chamber defined by the surfaces of said cover member, said base support member, and said means for sealing said base support member to said cover member;
   (b) temperature control means for selectively controlling the temperature of said chamber, comprising:
      (i) control means for sensing and regulating the temperature of one or more surfaces of said chamber;
      (ii) convection cooling means; and
      (iii) resistance heating means;
   (c) fluid control means for controlling and altering the fluid in said chamber retaining said object, comprising:
      (i) inlet and outlet channels for communicating fluid into and out of said chamber;
      (ii) a reservoir connected to said fluid inlet channel, said reservoir having inlet and outlet channels; and
      (iii) suction means for causing bidirectional movement of fluid between said inlet channel and said outlet channel of said chamber;
   (d) means for nucleating ice crystals in said chamber, comprising:
      (i) an outlet tube communicating with said chamber, said tube being constantly filled with fluid;
      (ii) said outlet tube being positioned adjacent said base support member and forming a cooling chamber therebetween for receiving coolant gas therein, thereby reducing the temperature of said fluid in said tube to form ice crystals therein; and
      (iii) means for heating said chamber to control the formation of ice crystals therein.

20. The stage assembly of claim 19 wherein said assembly for retaining the object being magnified further comprises a stationary inert mesh to support said object.

21. The stage assembly of claim 20 wherein said stationary inert mesh is nylon.

22. The stage assembly of claim 19 wherein said temperature control means include a microcomputer.

23. The stage assembly of claim 19 wherein said inlet channel to said chamber is located physically lower than said inlet and outlet channels to said reservoir, in an arrangement to trap bubbles in said reservoir.

24. The stage assembly of claim 19 further including logging means for recording variable conditions of said object or said assembly for retaining the object being magnified.

25. The stage assembly of claim 19 wherein said temperature control means further comprises a thin foil thermocouple laminated between to sheets of plastic, each sheet of said plastic being a thickness of from about 0.0010 to about 0.0020 inches.

26. The stage assembly of claim 19 wherein said outlet channel from said chamber is a copper tube positioned within a larger channel such that a coolant fluid can be circulated over the exterior surface of said copper tube.

27. The stage assembly of claim 19, wherein said reservoir further comprises temperature control means to control the temperature of fluids in said reservoir.

28. The stage assembly of claim 19 wherein said resistance heating means includes electrical connection of heating means to said stage assembly by colloidal silver connectors.

29. A stage assembly for use in combination with a light microscope, said assembly permitting observation of an object under magnification, comprising:
   (a) an assembly to retain an object being magnified, comprising:
      (i) a base support member having a transparent portion through which the object is viewable;
      (ii) a cover member having a transparent portion through which the object is viewable, said cover member being removably coupled to said base support member;
      (iii) means for sealing said base support member to said cover member;
      (iv) a chamber defined by the surfaces of said cover member, said base support member, and said means for sealing said base support member to said cover member; and
      (v) a stationary inert nylon mesh member supporting said object;

(b) temperature control means for selectively controlling the temperature of said chamber, comprising:
  (i) control means for sensing and regulating the temperature of one or more surfaces of said chamber;
  (ii) convection cooling means; and
  (iii) resistance heating means;
(c) fluid control means for controlling and altering the fluid in said chamber retaining said object, comprising:
  (i) fluid inlet and outlet channels for communicating fluid into and out of said chamber;
  (ii) a reservoir connected to said fluid inlet channel, said reservoir having an inlet and outlet channel; and
  (iii) suction means for causing bidirectional movement of fluid between said inlet channel and said outlet channel of said chamber;
(d) means for nucleating ice crystals in said chamber, comprising:
  (i) an outlet tube communicating with said chamber, said tube being constantly filled with the fluid;
  (ii) said outlet tube being positioned within said base support member and forming a cooling chamber therebetween for receiving coolant gas therein, thereby reducing the temperature of said fluid in said tube to form ice crystals therein;
  (iii) resistance heating means for controlling the formation of ice crystals in said chamber;
(e) a microcomputer functionally attached to said temperature control means and said fluid control means, said microcomputer being programmable to control the thermal and fluid environment of said object in said chamber; and
(f) logging means for recording variable conditions of said object or said support assembly.

30. A stage assembly for use in combination with a magnification apparatus to permit viewing of an object being retained in said assembly, comprising:
(a) a sample chamber for retaining said object and receiving fluid therein, said sample chamber comprising:
  (i) a base support member having a transparent portion;
  (ii) a cover member having a transparent portion removably coupled to said base support member;
  (iii) means for sealing said base support member to said cover; and
  (iv) a chamber defined by the surfaces of said base support member, said cover member, and said sealing means;
(b) means for illuminating said object;
(c) temperature control means for heating and cooling said object; and
(d) fluid control means for controlling and altering the fluid in said chamber retaining said object, comprising:
  (i) fluid inlet and outlet channels for fluid communicating directly with said chamber;
  (ii) a reservoir connected to said fluid inlet channel, said reservoir having an inlet and an outlet channel;
  (iii) a suction means for causing movement of fluid between said fluid inlet channel and said fluid outlet channel; and
  (iv) said fluid inlet channel for communicating directly with said sample chamber being located physically lower than said inlet and outlet channels to said reservoir, in an arrangement to trap bubbles in said reservoir.

* * * * *

UNITED STATES PATENT AND TRADEMARK OFFICE
CERTIFICATE OF CORRECTION

PATENT NO. : 5,257,128
DATED : October 26, 1993
INVENTOR(S) : Kenneth R. Diller et al.

It is certified that error appears in the above-indentified patent and that said Letters Patent is hereby corrected as shown below:

Column 16, line 35, delete "to" and insert therefor --two--.

Signed and Sealed this

Twelfth Day of July, 1994

Attest:

BRUCE LEHMAN

Attesting Officer    Commissioner of Patents and Trademarks